(12) United States Patent
Tornabene et al.

(10) Patent No.: US 6,880,835 B2
(45) Date of Patent: Apr. 19, 2005

(54) COMBINATION HAND TRUCK, STEP LADDER AND DOLLY

(75) Inventors: Dean Tornabene, Marina Del Ray, CA (US); Mitchell H. Babkes, Saugus, CA (US); Henry J. Howell, Long Beach, CA (US)

(73) Assignee: Sylmark Holdings Limited (IE)

( * ) Notice: Subject to any disclaimer, the term of this patent is extended or adjusted under 35 U.S.C. 154(b) by 81 days.

(21) Appl. No.: 10/412,610

(22) Filed: Apr. 11, 2003

(65) Prior Publication Data

US 2004/0201186 A1 Oct. 14, 2004

(51) Int. Cl.[7] .............................. B62B 1/12; B62B 3/02
(52) U.S. Cl. .......................................... 280/30; 182/20
(58) Field of Search .............................. 280/30, 47.24, 280/47.25, 47.26, 47.29, 639, 651, 659; 182/20, 121

(56) References Cited

U.S. PATENT DOCUMENTS

| 118,096 | A |   | 8/1871 | Bergmann |       |
|---------|---|---|--------|----------|-------|
| 119,339 | A | * | 9/1871 | Evans    | 280/30|
| 432,869 | A |   | 7/1890 | Fry      |       |
| 466,899 | A |   | 1/1892 | Bourell  |       |
| 518,698 | A |   | 4/1894 | Pipes    |       |
| 695,161 | A |   | 3/1902 | Linkert  |       |
| 867,754 | A |   | 10/1907| Randall  |       |
| 938,952 | A |   | 11/1909| Berg     |       |
| 1,116,779 | A |   | 11/1914| Witt     |       |
| 1,221,579 | A |   | 4/1917 | Olds     |       |
| 1,226,324 | A |   | 5/1917 | Gage     |       |
| 1,478,204 | A |   | 12/1923| Cooney et al. |  |
| 1,601,250 | A |   | 9/1926 | Hilderbrand |     |
| 1,938,507 | A |   | 12/1933| Wilson   |       |
| 2,271,332 | A |   | 1/1942 | Ellington|       |
| 2,990,764 | A |   | 7/1961 | Wilder   |       |

(Continued)

FOREIGN PATENT DOCUMENTS

| DE | 2004032 | * | 8/1970 | .................. 280/30 |
| FR | 1004185 | * | 3/1952 | .................. 280/30 |
| GB | 753922  | * | 8/1956 | .................. 280/30 |
| NL | 8900002 | * | 8/1990 | .................. 280/30 |

*Primary Examiner*—Frank Vanaman
(74) *Attorney, Agent, or Firm*—Kathy Mojibi Kavcioglu

(57) ABSTRACT

A combination hand truck, dolly and step ladder device includes a hand truck frame and a step ladder frame that are pivotally attached to one another and can be fixed at selective angles with respect to each other to form a hand truck, a dolly and a step ladder. In a step ladder configuration, the top step of a step assembly is secured to a cross member of the hand truck frame so as to lock the hand truck frame and the step ladder frame into a substantially fixed relationship to one another. In a dolly configuration, the hand truck frame becomes the handle for the dolly, and is held in place by a support bar that pivotally attaches to the hand truck frame and secures to the step ladder frame.

12 Claims, 20 Drawing Sheets

U.S. PATENT DOCUMENTS

| | | | |
|---|---|---|---|
| 3,104,889 A | | 9/1963 | Branch |
| 3,430,972 A | * | 3/1969 | Fiedler .................. 280/30 |
| 3,434,566 A | | 3/1969 | Miller |
| 3,561,787 A | | 2/1971 | Toda et al. |
| 3,643,292 A | | 2/1972 | Mayer |
| 3,655,012 A | | 4/1972 | Hoffman et al. |
| 3,713,510 A | | 1/1973 | O'Dell |
| 3,785,669 A | | 1/1974 | Doheny |
| 3,857,460 A | | 12/1974 | Nini |
| 3,954,155 A | | 5/1976 | Guidara |
| 3,955,240 A | | 5/1976 | Schuh et al. |
| D249,032 S | | 8/1978 | Tarran |
| 4,106,590 A | | 8/1978 | Tarran |
| 4,191,397 A | | 3/1980 | Kassai |
| 4,235,449 A | | 11/1980 | Tarran |
| 4,253,546 A | | 3/1981 | Uchida |
| 4,258,826 A | | 3/1981 | Murray |
| 4,258,827 A | | 3/1981 | Klose |
| 4,261,435 A | * | 4/1981 | Winter .................. 182/129 |
| 4,326,731 A | * | 4/1982 | Woychio et al. ............ 280/641 |
| 4,341,393 A | | 7/1982 | Gordon et al. |
| 4,448,282 A | | 5/1984 | Giezendanner |
| 4,456,094 A | | 6/1984 | Brander |
| 4,474,264 A | | 10/1984 | Krause |
| 4,494,626 A | | 1/1985 | Ast |
| 4,543,006 A | | 9/1985 | Wang |
| 4,577,986 A | | 3/1986 | Wang |
| 4,635,956 A | * | 1/1987 | Morrissette ............ 280/652 |
| 4,730,697 A | * | 3/1988 | Campbell ............ 182/121 |
| 4,770,559 A | | 9/1988 | Yoo |
| 4,798,304 A | | 1/1989 | Rader |
| 4,824,167 A | | 4/1989 | King |
| 4,846,486 A | | 7/1989 | Hobson |
| 4,887,837 A | | 12/1989 | Bonewicz, Jr. et al. |
| 4,934,485 A | | 6/1990 | Purkapile |
| 5,022,118 A | | 6/1991 | Wan-Li |
| 5,058,239 A | | 10/1991 | Lee |
| 5,064,020 A | | 11/1991 | Eagleson |
| 5,142,739 A | | 9/1992 | Lin |
| 5,161,811 A | | 11/1992 | Cheng |
| 5,257,799 A | | 11/1993 | Cone et al. |
| 5,306,027 A | | 4/1994 | Cheng |
| 5,382,032 A | | 1/1995 | Wilson |
| 5,427,393 A | | 6/1995 | Kriebel |
| 5,507,508 A | | 4/1996 | Liang |
| 5,562,299 A | | 10/1996 | Morrissette |
| 5,669,659 A | | 9/1997 | Dittmer |
| 5,836,595 A | | 11/1998 | Brice |
| 5,871,227 A | | 2/1999 | Huang |
| 6,039,149 A | | 3/2000 | Bedja et al. |
| 6,059,158 A | * | 5/2000 | Hsu .................. 224/274 |
| 6,102,479 A | | 8/2000 | Wallace |
| 6,131,926 A | * | 10/2000 | Harlan .................. 280/47.26 |
| 6,158,749 A | | 12/2000 | Roudebush |
| 6,173,811 B1 | | 1/2001 | Tornabene et al. |
| 6,196,560 B1 | | 3/2001 | Ohlsson |
| 6,238,125 B1 | | 5/2001 | Lin |
| 6,308,967 B1 | | 10/2001 | Stallbaumer et al. |
| 6,328,319 B1 | | 12/2001 | Stahler, Sr. |
| 6,328,330 B1 | | 12/2001 | Haaser |
| 6,390,495 B1 | | 5/2002 | Cates |
| 6,454,050 B1 | | 9/2002 | Gibson et al. |
| 6,474,663 B1 | | 11/2002 | Becker |
| 6,505,707 B1 | | 1/2003 | Berry |
| 6,530,583 B1 | | 3/2003 | Mueller |
| 6,651,774 B1 | | 11/2003 | Yoo |
| 2001/0045718 A1 | | 11/2001 | Boirum |
| 2003/0012595 A1 | | 1/2003 | Park et al. |

* cited by examiner

COMBINATION HAND TRUCK, STEP LADDER AND DOLLY

BACKGROUND OF THE INVENTION

I. Field of the Invention

The present invention generally relates to a multi-use hand truck, and more specifically, to a hand truck that can be converted into a step ladder or a dolly.

II. Description of Related Art

The use of hand trucks, dollies, and step ladders by private individuals and businesses is widely known. Such devices are commonly used for moving, lifting, and supporting loads in the performance of various physical tasks. Accordingly, the need and desirability for such devices is without question, and need not be discussed herein.

Numerous designs have been utilized over the years for individual hand truck, dolly and step ladder devices. In fact, such devices have been combined into a single device, such as the combination hand truck, step ladder, and basket carrier of U.S. Pat. No. 6,173,811, the combined hand truck and ladder of U.S. Pat. No. 4,106,590, the step ladder dolly of U.S. Pat. No. 3,954,155, and the hand truck of U.S. Pat. No. 3,104,889.

However, these combination devices have generally failed in providing the user completely functional embodiments of the respective individual devices. The task of combining multiple functionalities into a single device is inherently difficult to do without sacrificing some of the functionality in exchange for the added convenience of having the combination in a single device. For example, the hand truck of the '889 patent does not have an upright handle in the dolly configuration, only has three wheels in the dolly configuration, and does not provide for the locking of the ladder support or prop in the hand truck configuration. As further examples, the step ladder dolly of the '155 patent does not have an upright handle in the dolly configuration, and the combined hand truck and ladder of the '590 patent requires the device to be inverted from the hand truck configuration in order to configure the device as a step ladder, as shown in FIG. 7 thereof. In addition, the step ladder configuration of the '590 patent is limited in the load that it can support based upon the design of the back frame member, which supports the ladder. As a final example, the combination hand truck, step ladder, and basket carrier of the '811 patent does not include a dolly configuration nor means for locking the hand truck support frame assembly and the step ladder support frame assembly together when in use, such as in the hand truck configuration.

Thus, an unresolved need exists in the industry for a combination hand truck, step ladder and dolly that is fully functional in each configuration.

SUMMARY OF THE INVENTION

Briefly stated, the present invention provides a multi-use move, lift and support device, which in the illustrative embodiment is a combination hand truck, dolly and step ladder device. The combination device includes a hand truck frame and a step ladder frame that are pivotally attached to one another. The two frames are positioned together in the hand truck configuration, at an approximately 20 to 45 degree angle in the step ladder configuration, and at an approximately 90 degree angle in the dolly configuration. A support plate is pivotally mounted to the hand truck support frame at a distal end thereof. The support plate is configured to secure the hand truck frame and the step ladder frame together when in either an upright or lowered position, and can be positioned to release the hand truck frame from the step ladder frame. The device can be converted to a step ladder configuration by positioning the hand truck frame and the step ladder frame at an approximately 20 to 45 degree angle to form step ladder. A step assembly comprising a plurality of steps are pivotally mounted to the step ladder frame, and can be rotated and secured into a horizontal position to provide steps. The top step of the step assembly is secured to a cross member of the hand truck frame so as to lock the hand truck frame and the step ladder frame into a substantially fixed relationship to one another in the step ladder configuration. The device can be converted to a dolly configuration by positioning the step ladder frame and the hand truck frame at an approximately 90 degree angle with respect to one another. In this configuration, the hand truck frame becomes the handle for the dolly, and is held in place by a support bar that pivotally attaches to the hand truck frame and secures to the step ladder frame. The combination device of the present invention further includes a detachable crate for use in the hand truck configuration, a detachable seat for use in the step ladder configuration, and a tray for use in either the step ladder or dolly configurations.

BRIEF DESCRIPTION OF THE DRAWINGS

Figure 1:
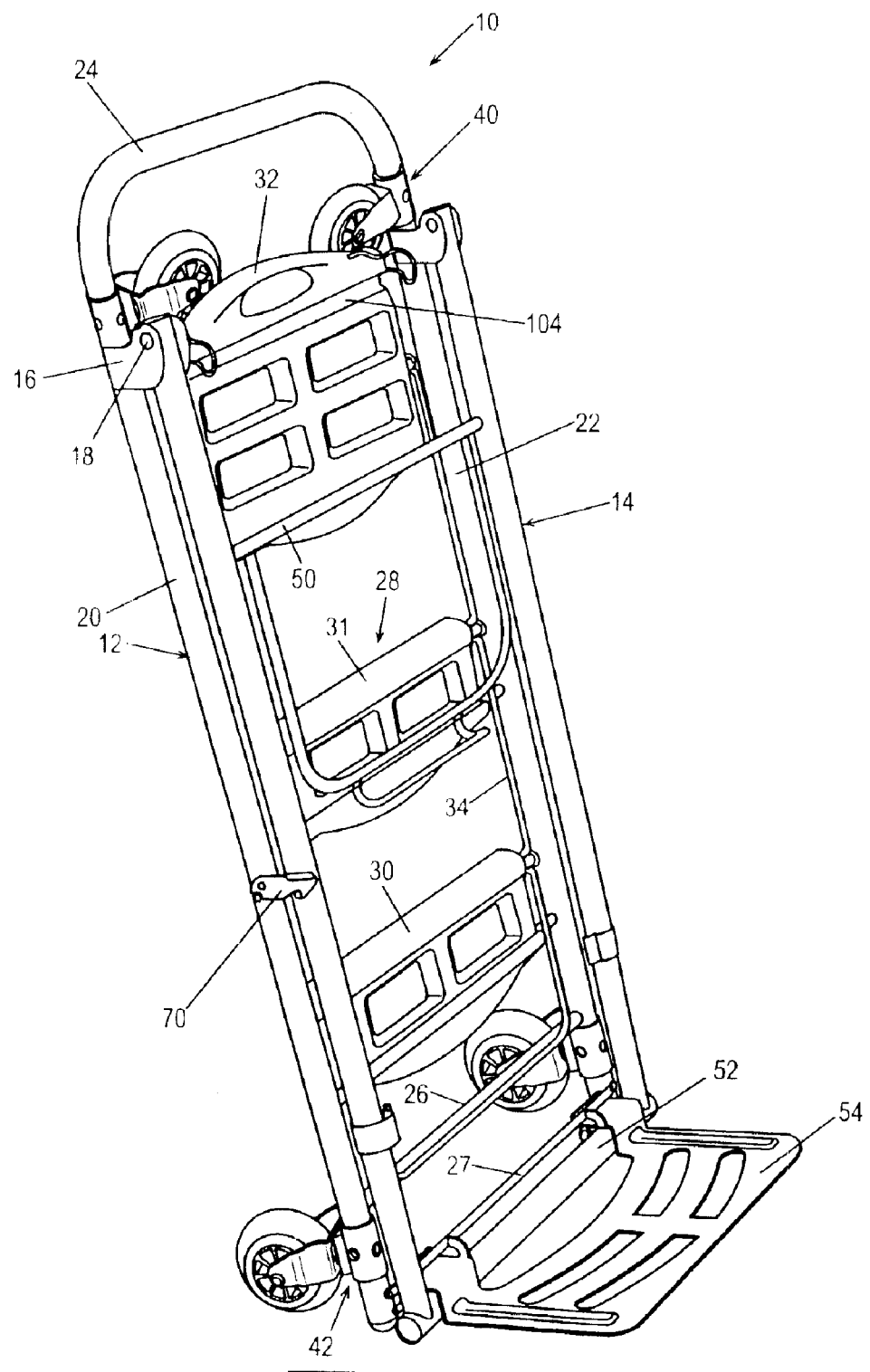

Having thus described the invention in general terms, reference will now be made to the accompanying drawings, which are not necessarily drawn to scale, and wherein:

FIG. 1 is a perspective view of a combination hand truck, dolly, and step ladder device in accordance with the present invention in a hand truck configuration.

Figure 2A:
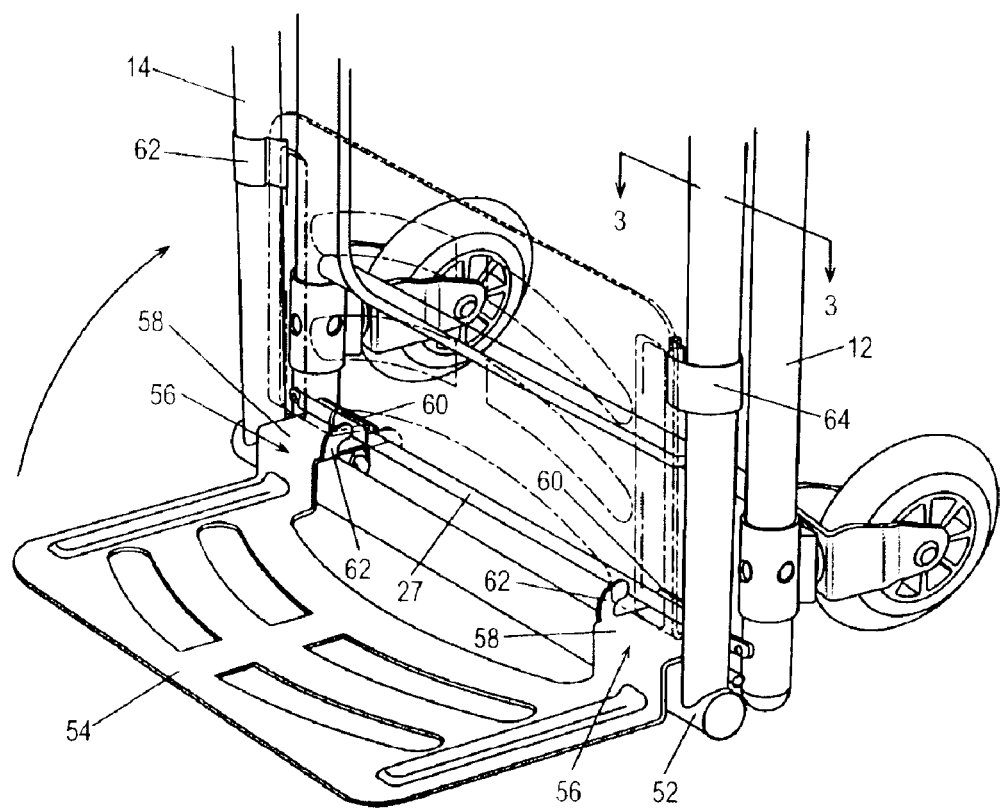
Figure 2B:
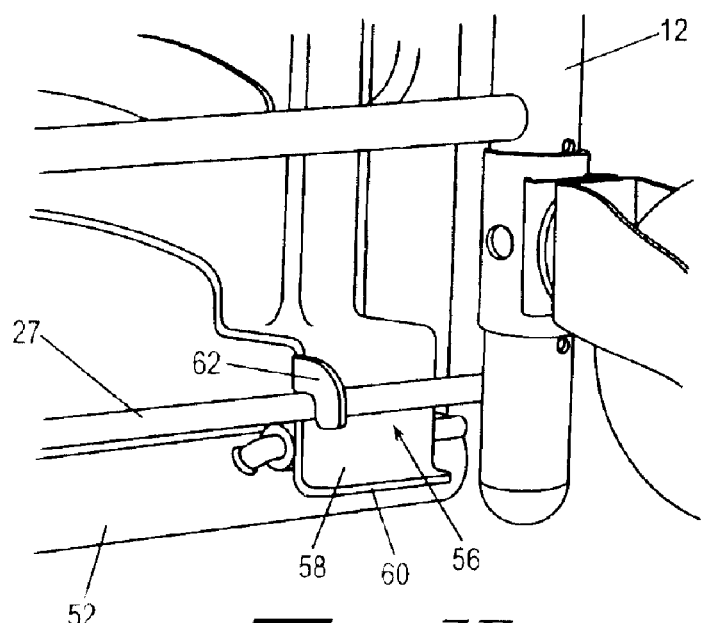

FIGS. 2A–2B are perspective views of the combination device of FIG. 1 showing a support plate in an upright position and lowered position in accordance with an embodiment of the present invention.

Figure 3:
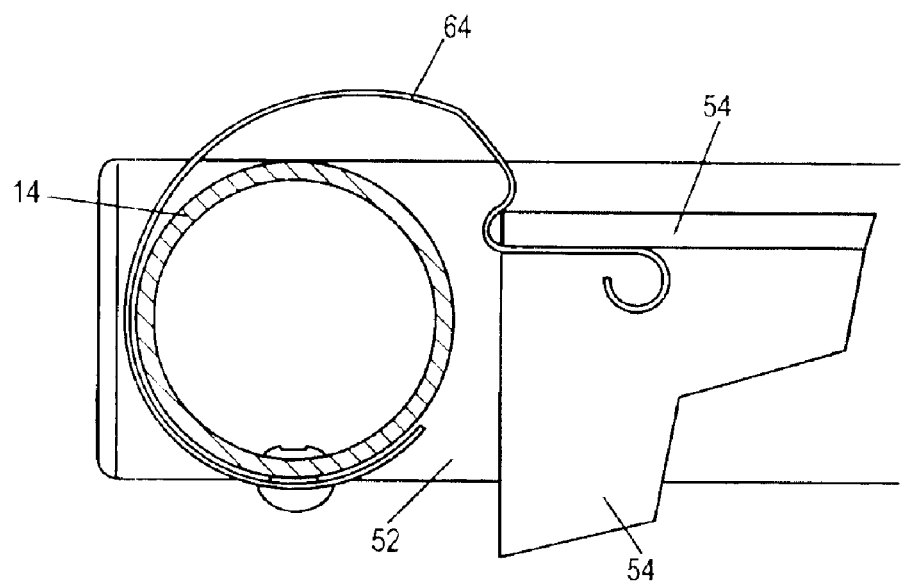

FIG. 3 is a partial cross sectional view taken along line 3'—3' of FIG. 2A, showing a retaining clip for the support plate in accordance with an embodiment of the present invention.

Figure 4A:
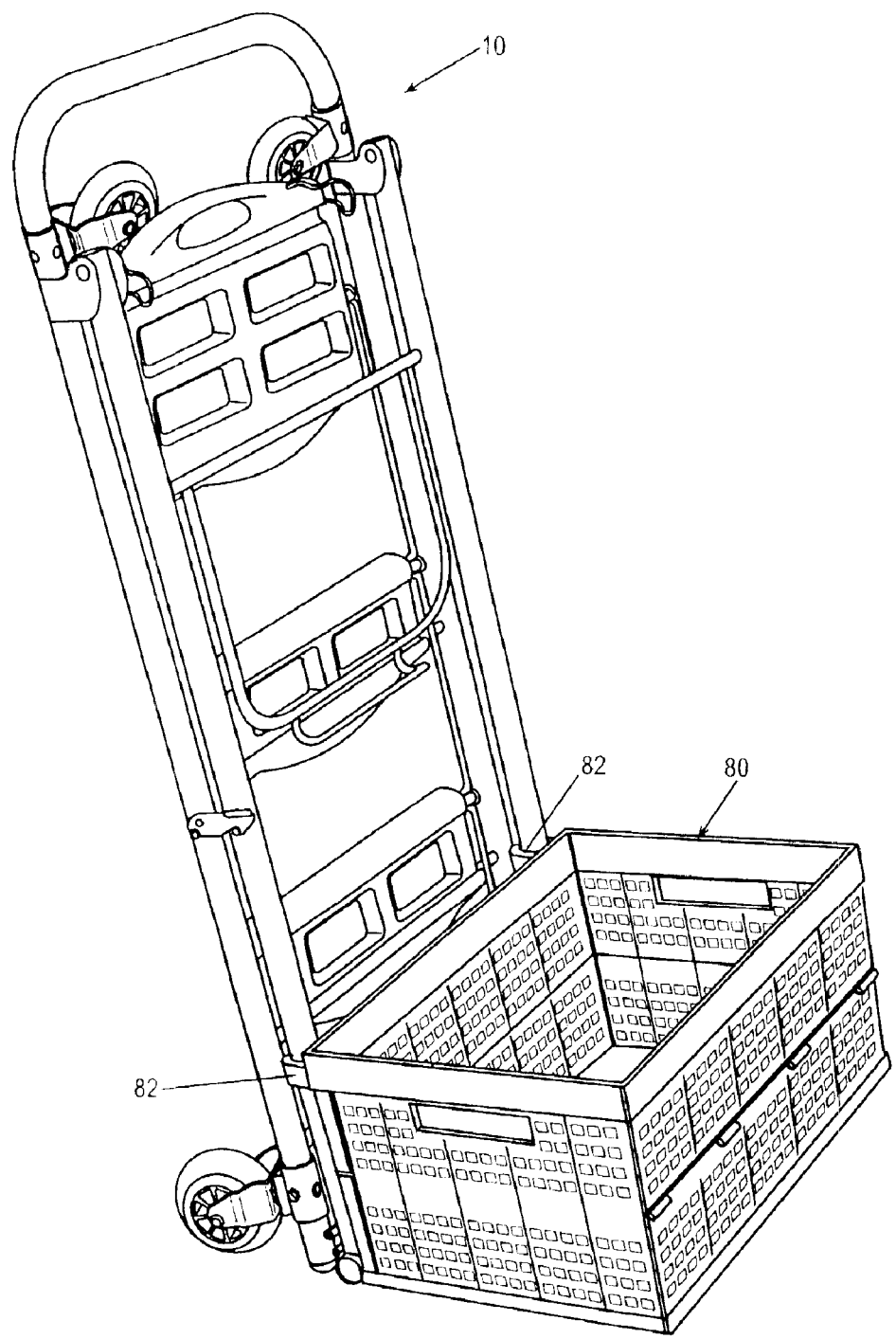
Figure 4B:
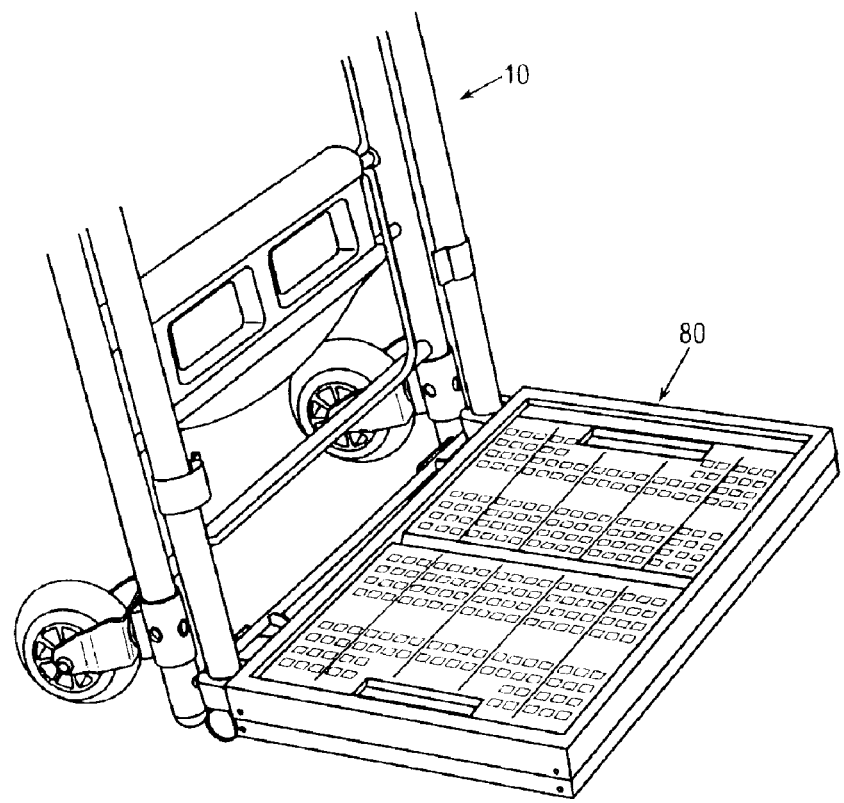
Figure 4C:
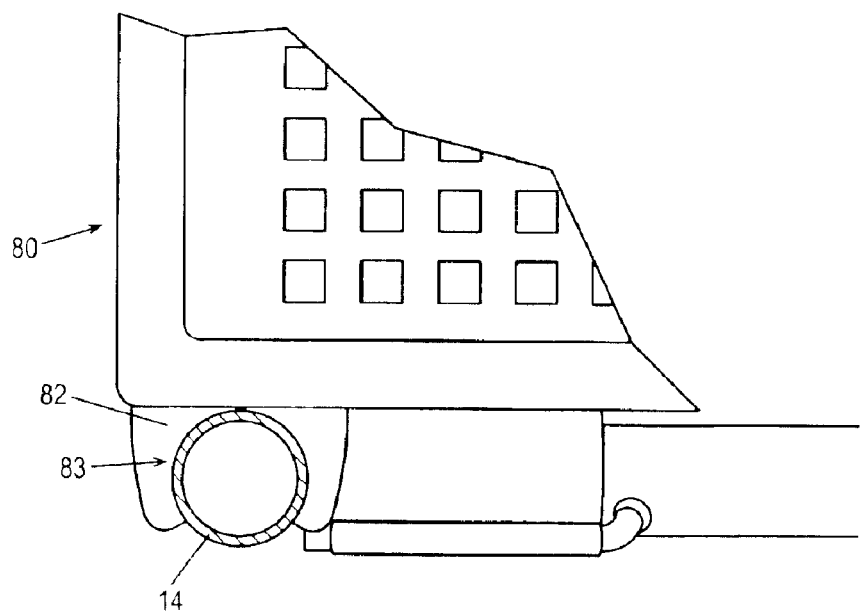

FIGS. 4A–4C are views of a combination hand truck, dolly, and step ladder device in accordance with the present invention in a hand truck configuration, showing a collapsible crate installed thereon.

Figure 4D:
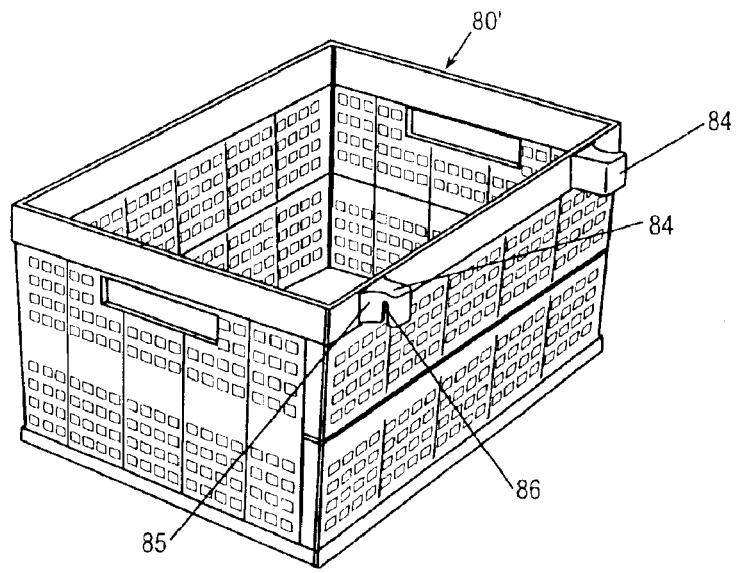
Figures 4E, 4F:
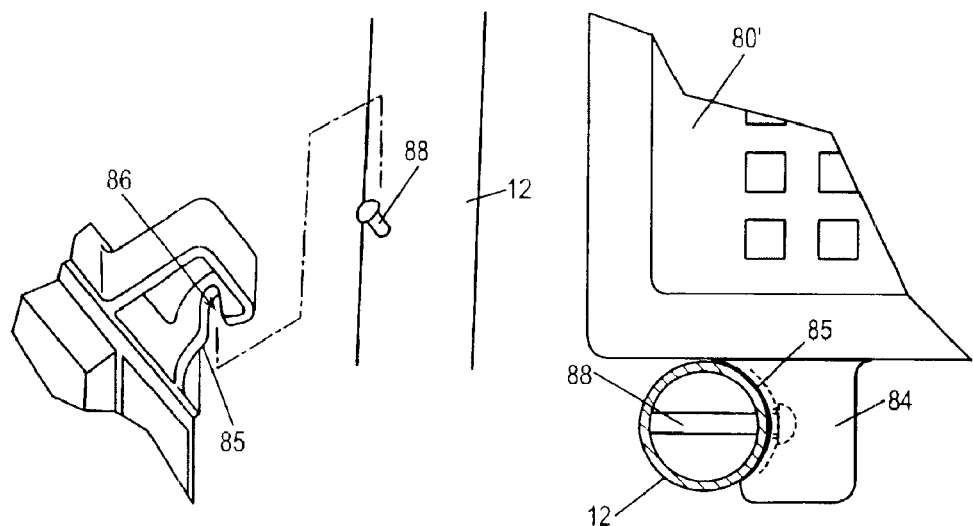

FIGS. 4D–4F are views of an alternative embodiment for attaching a collapsible crate to a combination hand truck, dolly and step ladder device in accordance with the present invention.

Figure 5:
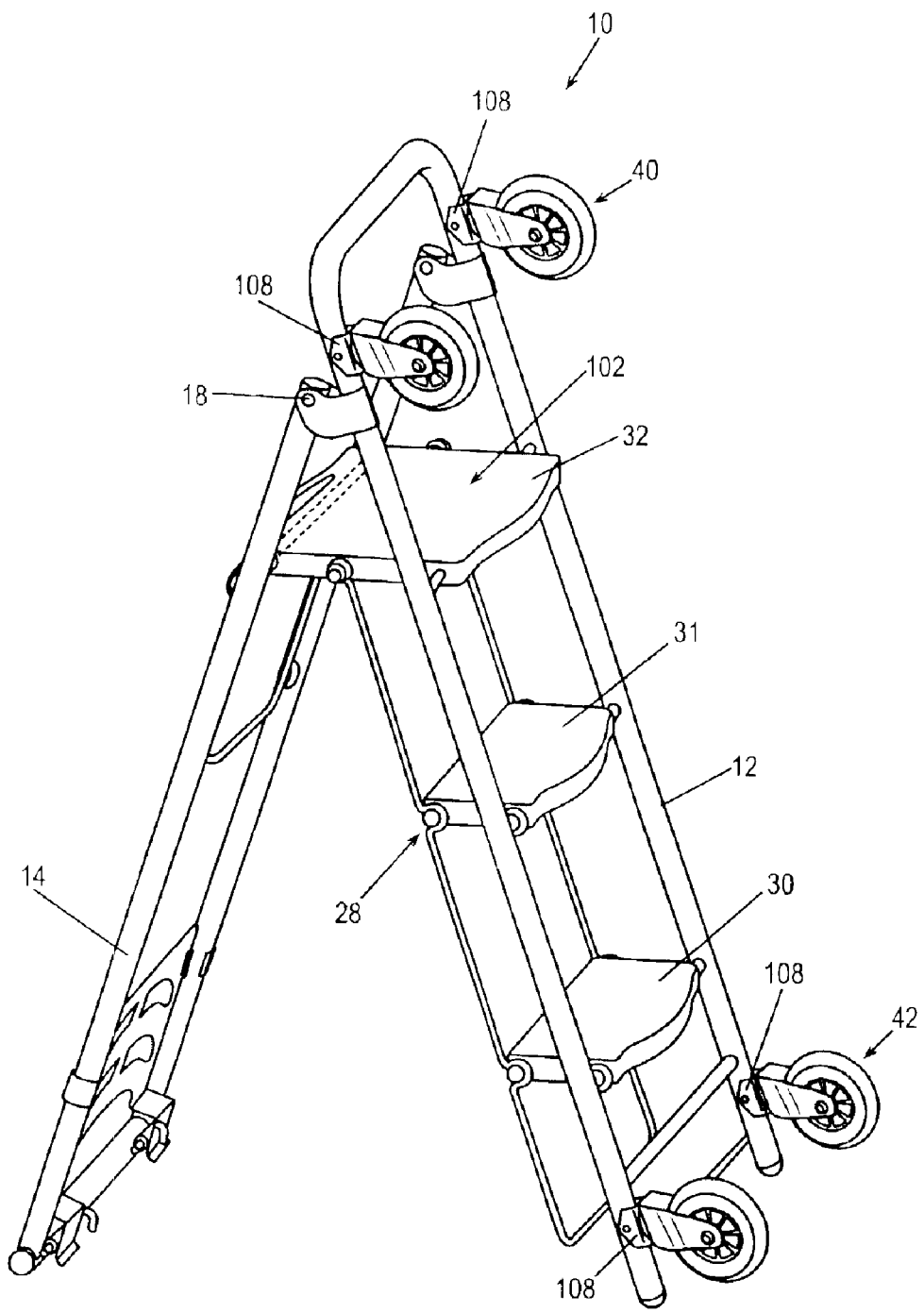

FIG. 5 is a perspective view of a combination hand truck, dolly, and step ladder device in accordance with the present invention in a step ladder configuration.

Figure 6:
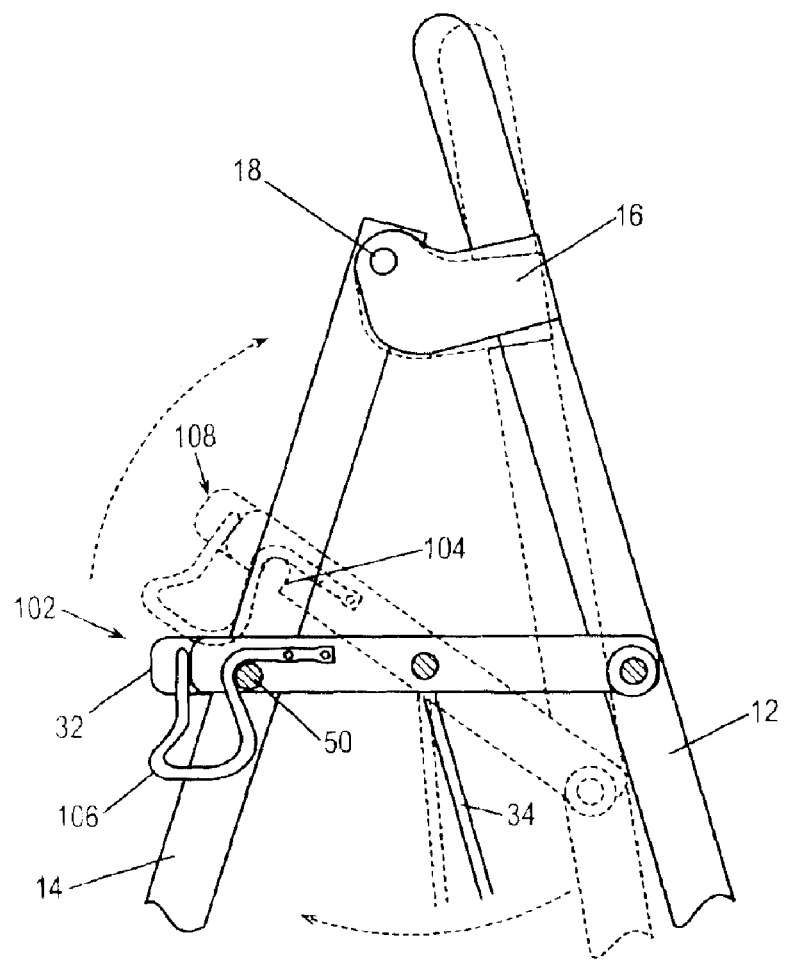

FIG. 6 is a partial cut-away side view of a combination hand truck, dolly and step ladder device according to the present invention in the step ladder configuration, showing the top step in use locking the frames of the device in the step ladder configuration.

Figure 7:
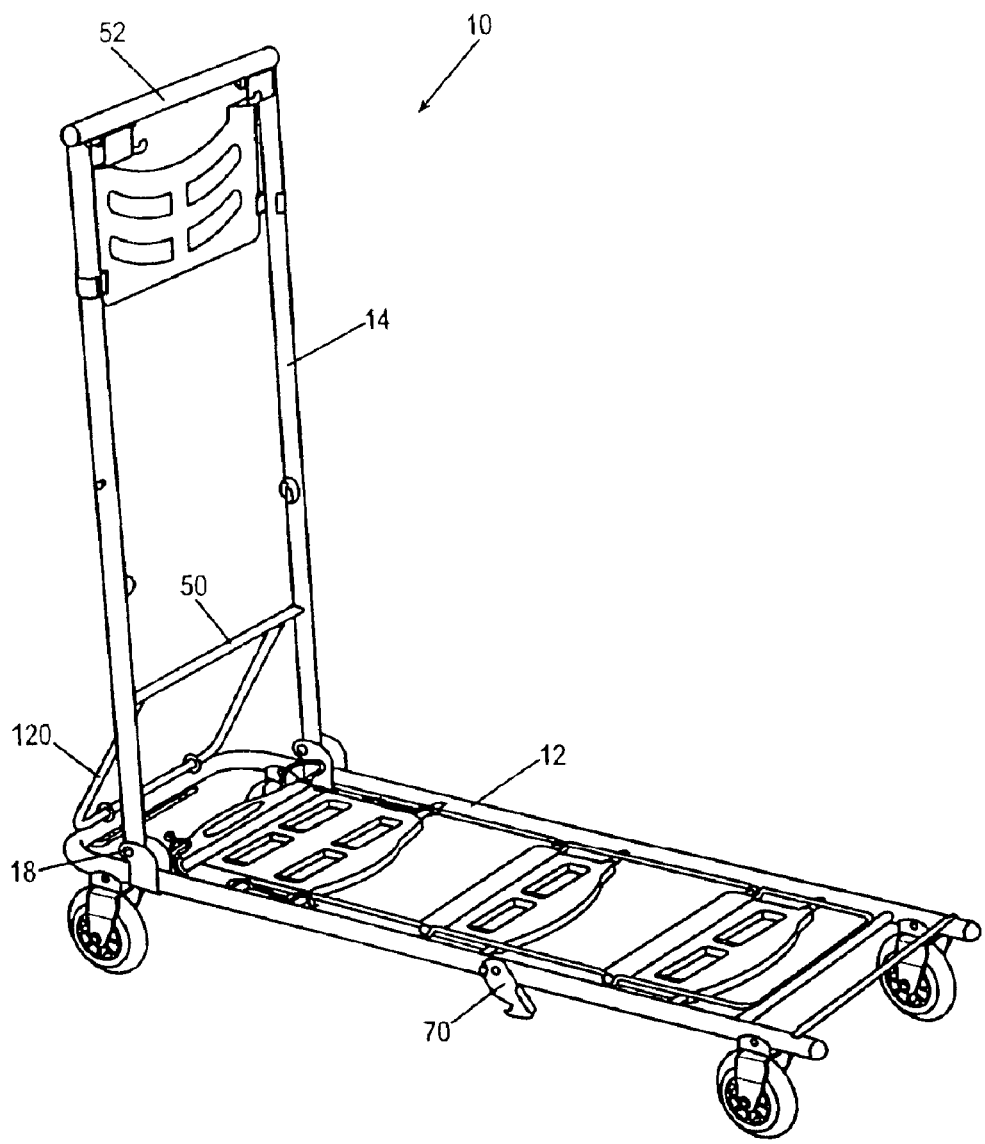

FIG. 7 is a perspective view of a combination hand truck, dolly, and step ladder device in accordance with the present invention in the dolly configuration.

Figure 8A:
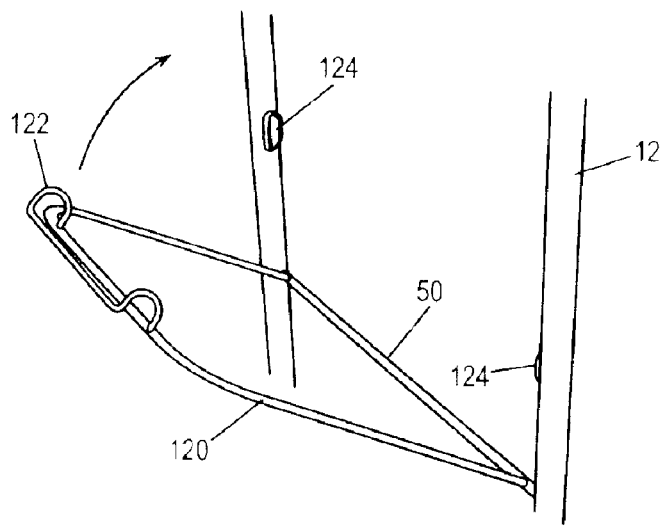

FIG. 8A is a partial perspective view of a combination hand truck, dolly and step ladder device in accordance with the present invention, showing a dolly support bar.

Figure 8B:
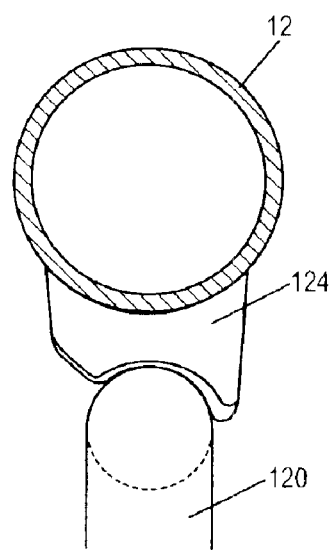

FIG. 8B is a cross section view taken along line 8b'—8b' of FIG. 8A showing the dolly support bar in a stored upright position.

Figure 9A:
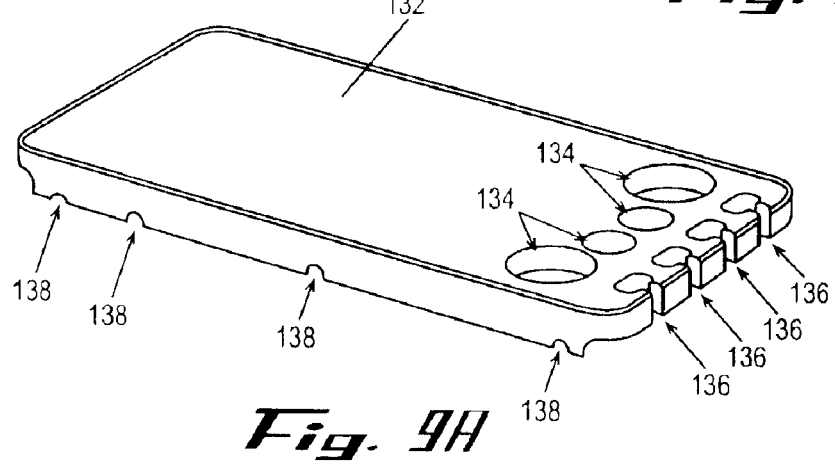

FIG. 9A is a perspective view of a detachable tray for use with a combination hand truck, dolly and step ladder device of the present invention in either a step ladder configuration or a dolly configuration.

Figure 9B:
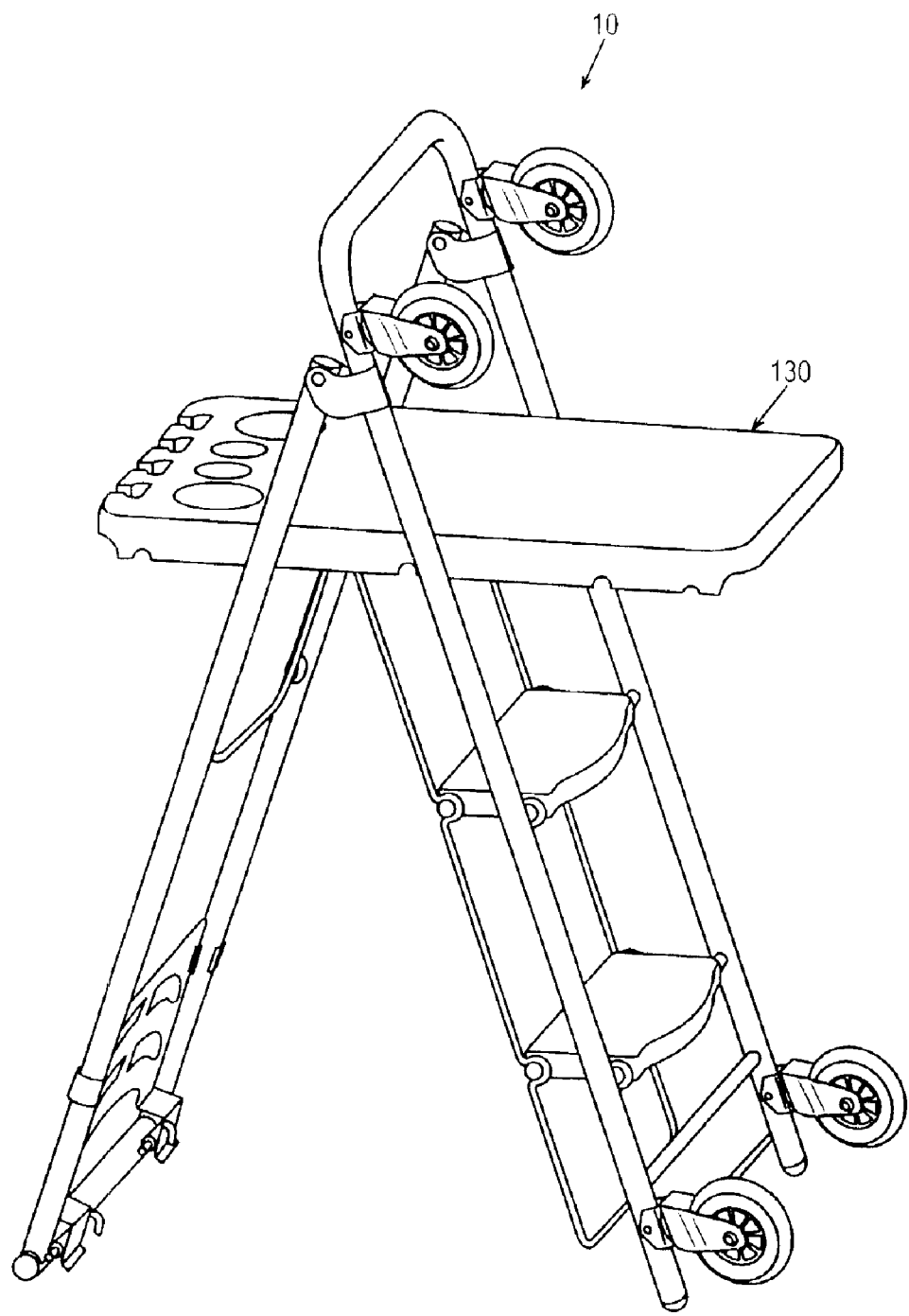

FIG. 9B is a perspective view of a combination hand truck, dolly, and step ladder device in accordance with the present invention in a step ladder configuration with the detachable tray of FIG. 9A attached thereto.

Figure 9C:
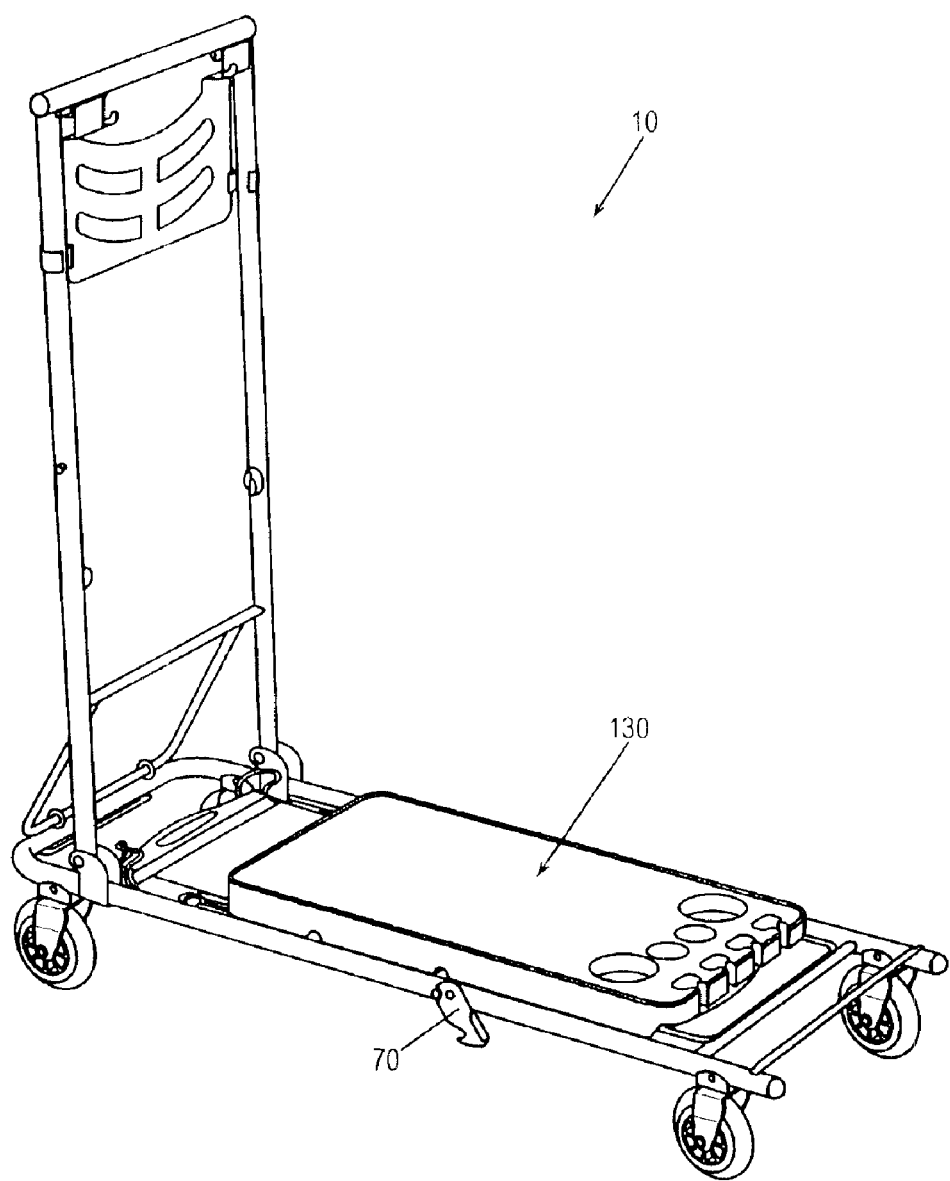

FIG. 9C is a perspective view of a combination hand truck, dolly, and step ladder device in accordance with the present invention in a dolly configuration with the detachable tray of FIG. 9A attached thereto.

Figure 10A:
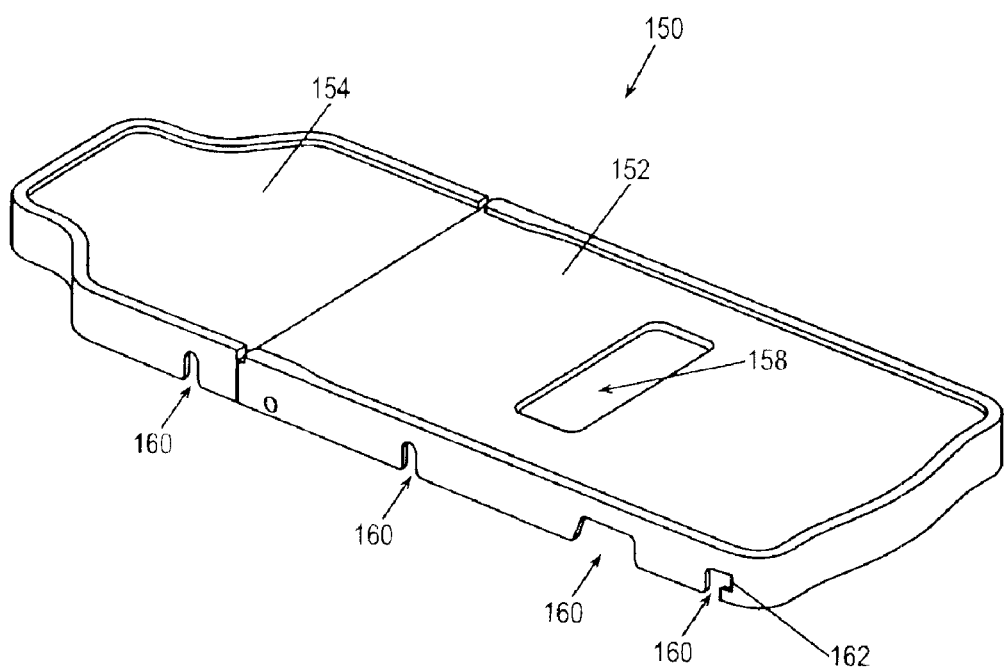

FIG. 10A is a perspective view of an alternate embodiment of a detachable tray for use with a combination hand truck, dolly and step ladder device of the present invention in either a step ladder configuration or a dolly configuration.

Figure 10B:
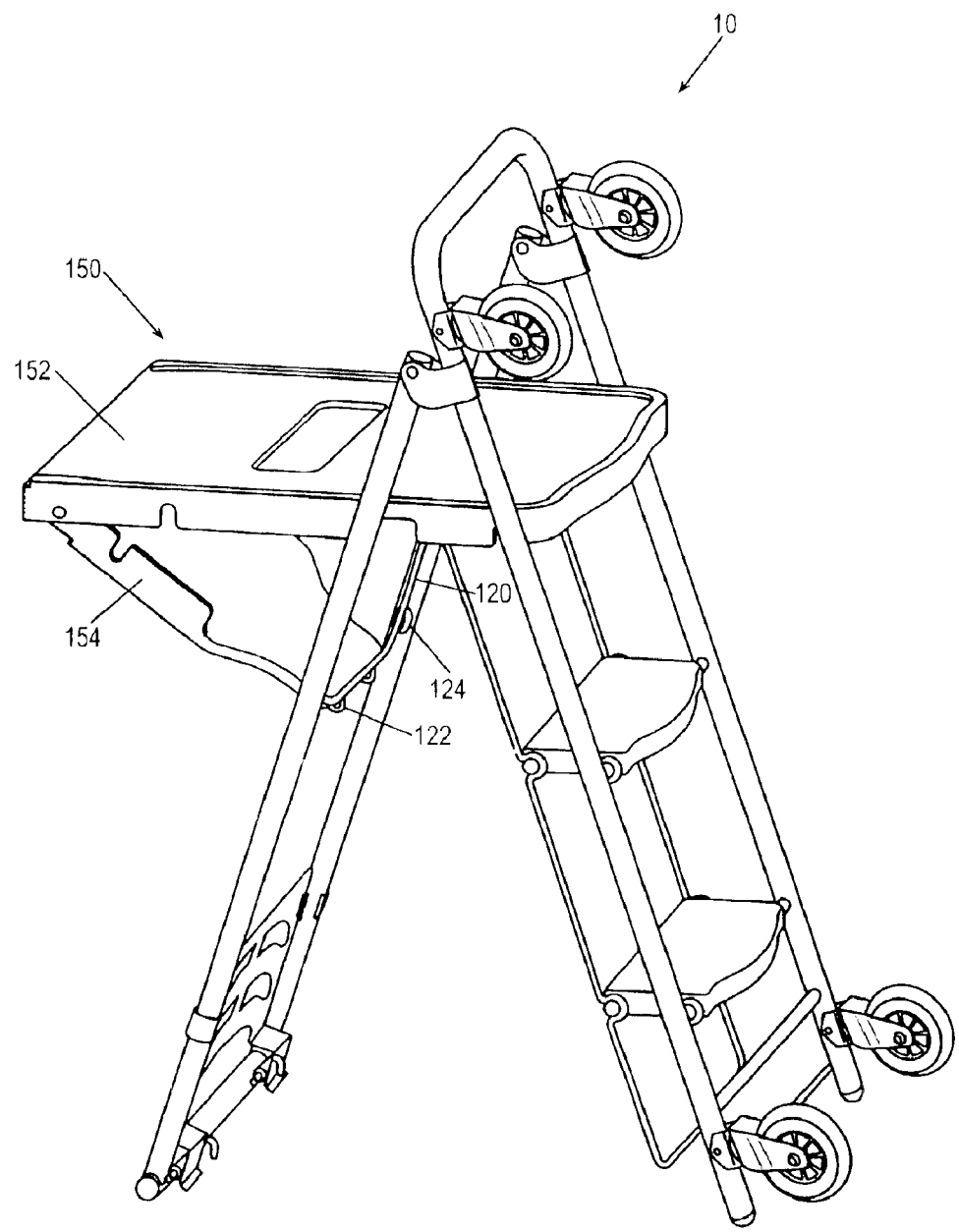

FIG. 10B is a perspective view of the detachable tray of FIG. 10A for use with a combination hand truck, dolly, and step ladder device in accordance with the present invention in a step ladder configuration.

Figure 10C:
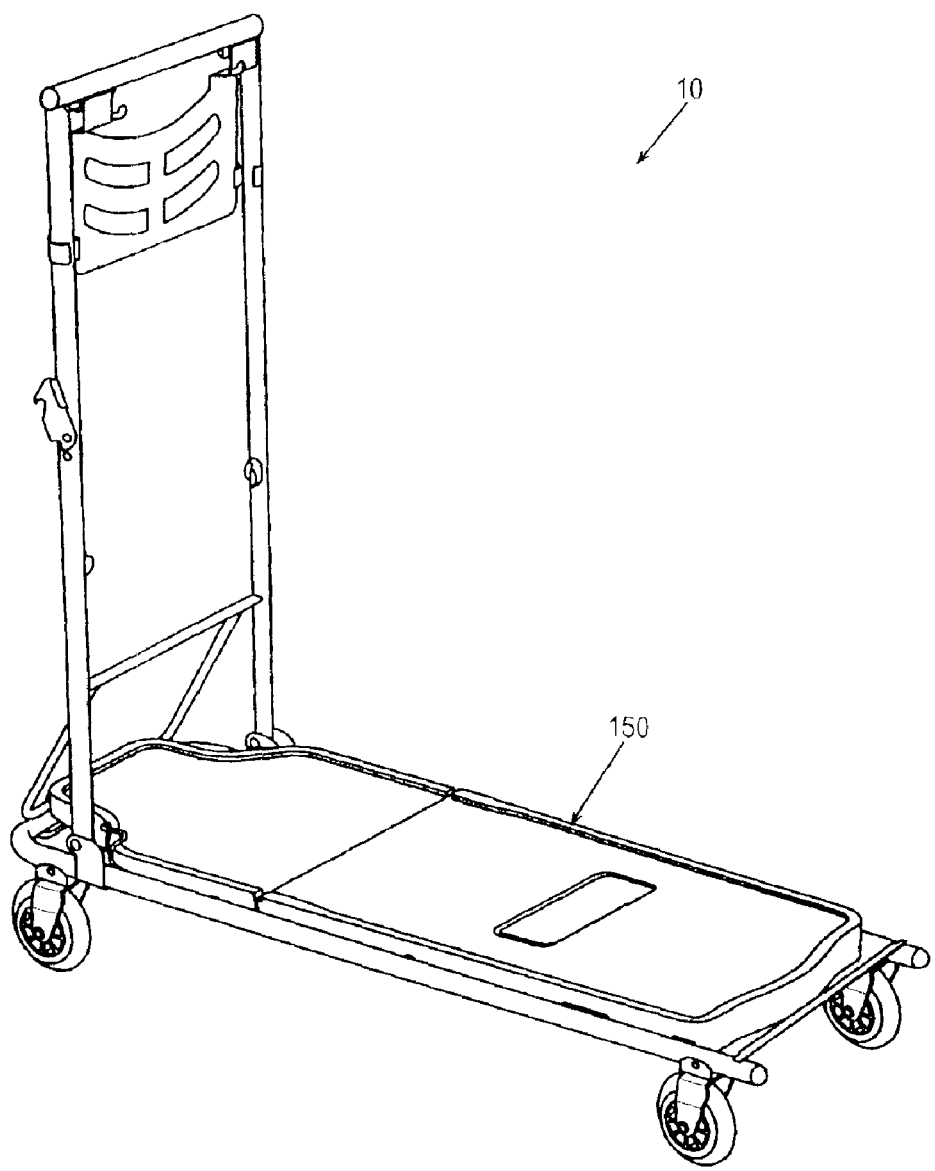

FIG. 10C is a perspective view of the detachable tray of FIG. 10A for use with a combination hand truck, dolly, and step ladder device in accordance with the present invention in a dolly configuration.

Figure 11A:
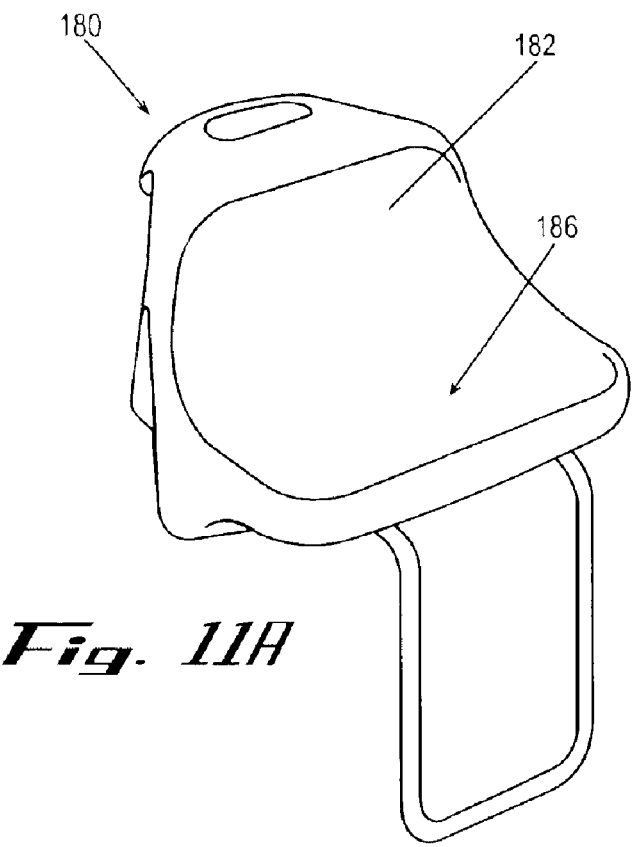

FIG. 11A is a perspective view of a detachable seat for use with a combination hand truck, dolly and step ladder device in accordance with the present invention in a step ladder configuration of the present invention.

Figure 11B:
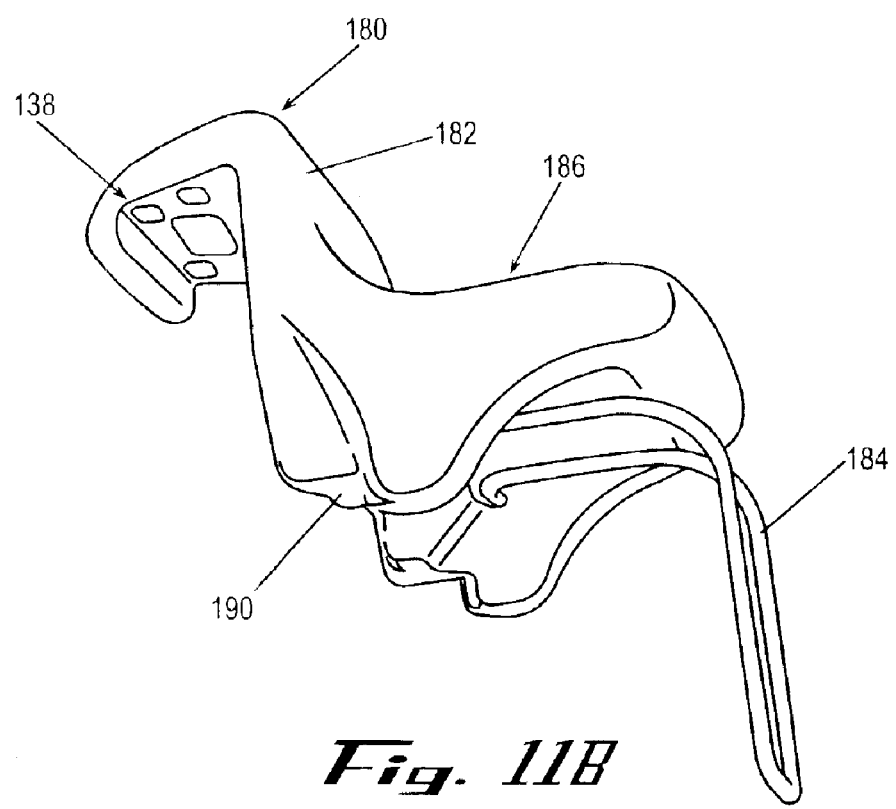

FIG. 11B is a bottom perspective view of the detachable scat of FIG. 11A.

Figure 11C:
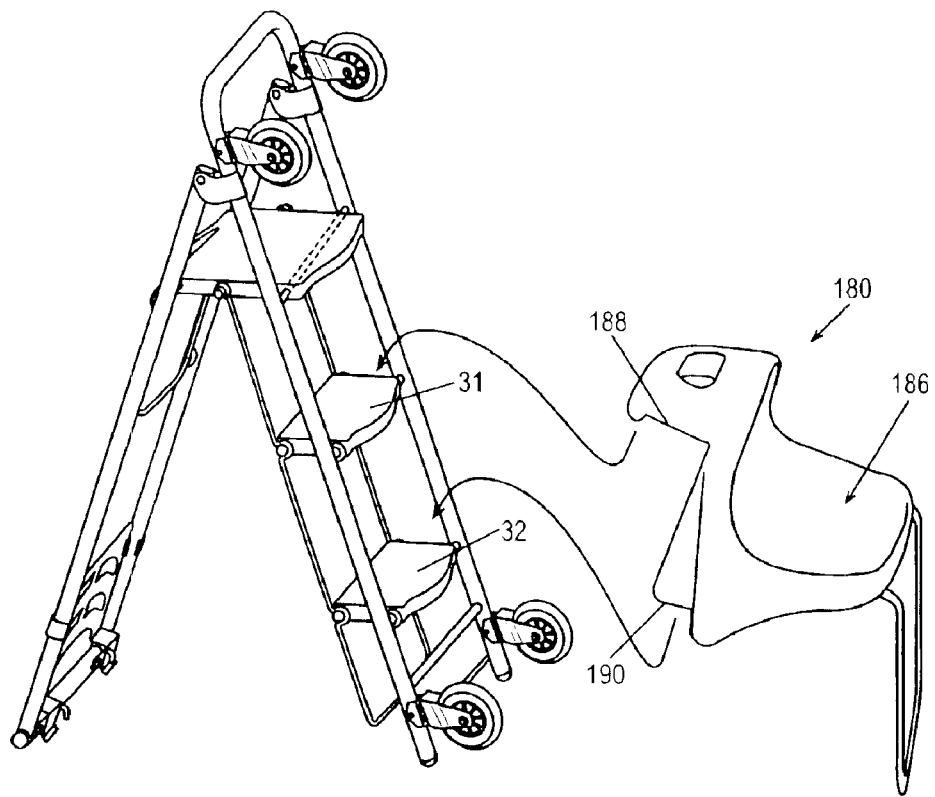

FIG. 11C is a partial side view of the detachable seat of FIG. 11A attached to a combination hand truck, dolly, and step ladder device in accordance with the present invention.

Figure 11D:
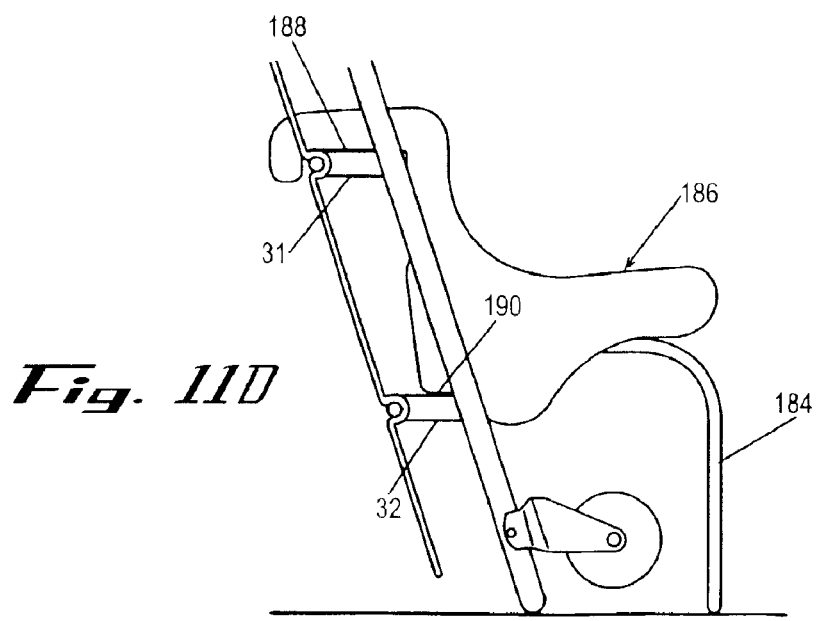

FIG. 11D is a perspective view of a combination hand truck, dolly, and step ladder device in accordance with the present invention in the step ladder configuration showing how the seat of FIG. 11A may be attached thereto.

Figure 12:
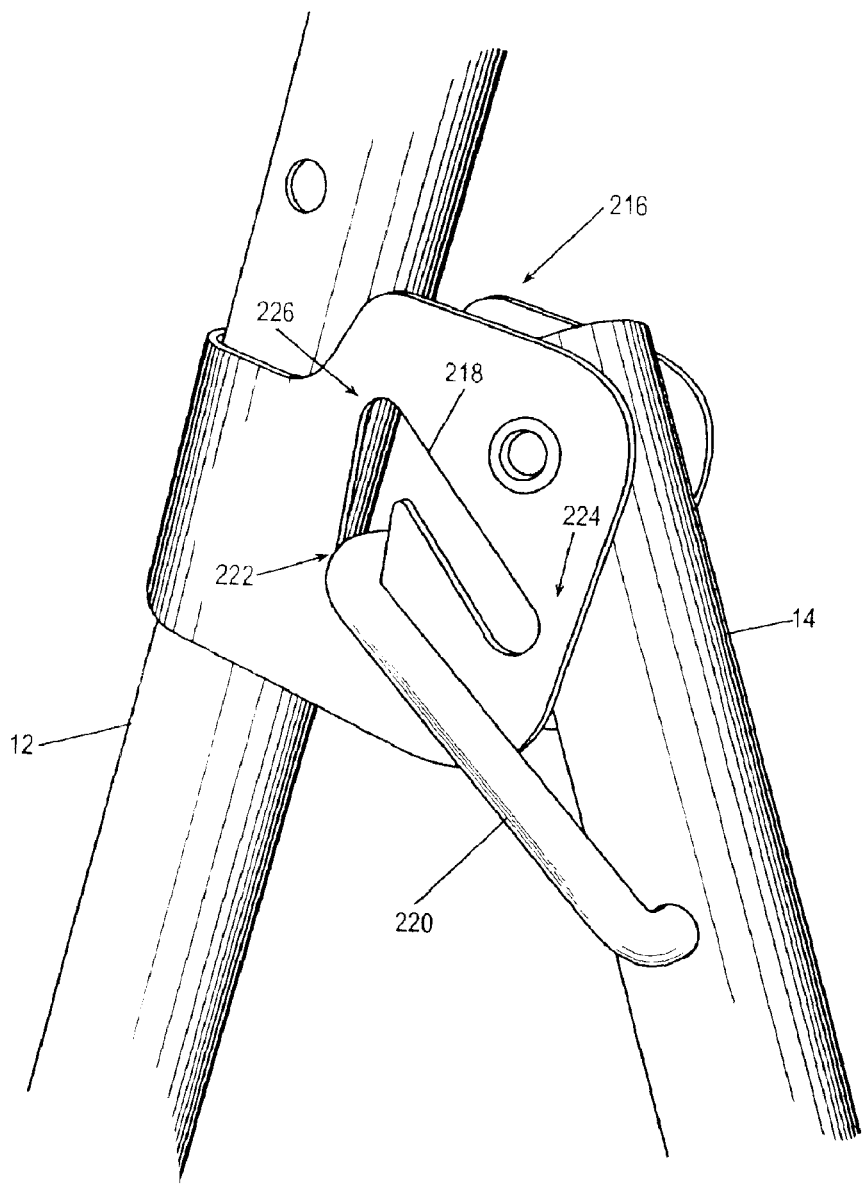

FIG. 12 is a perspective view of an alternative embodiment for the hinge between the step ladder frame and the hand truck frame.

Figure 13:
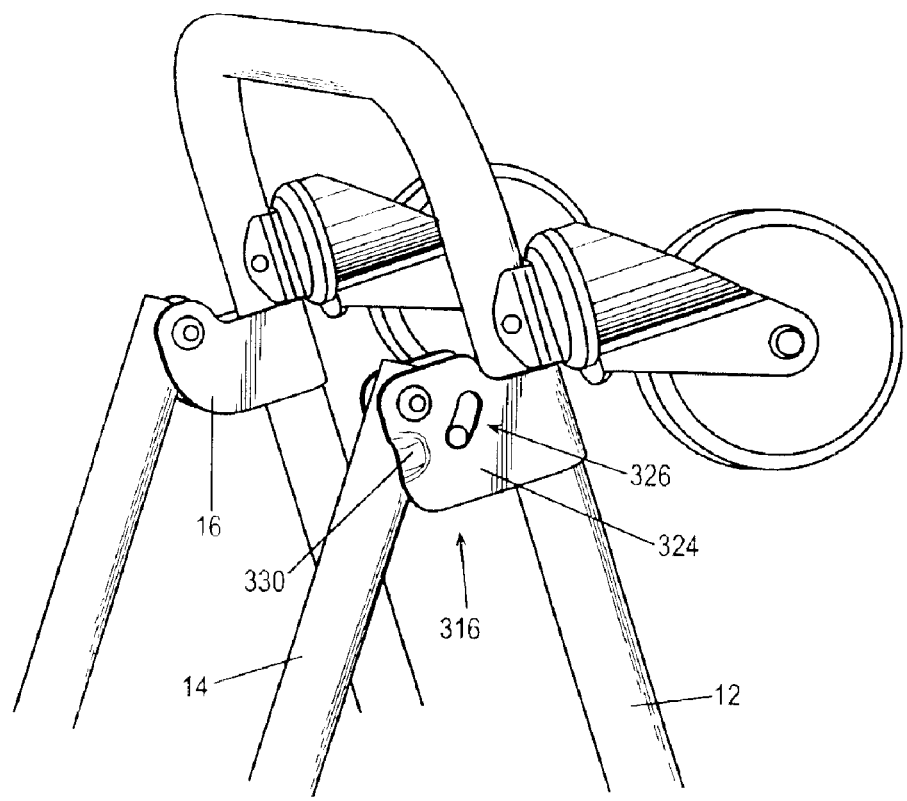
Figure 14:
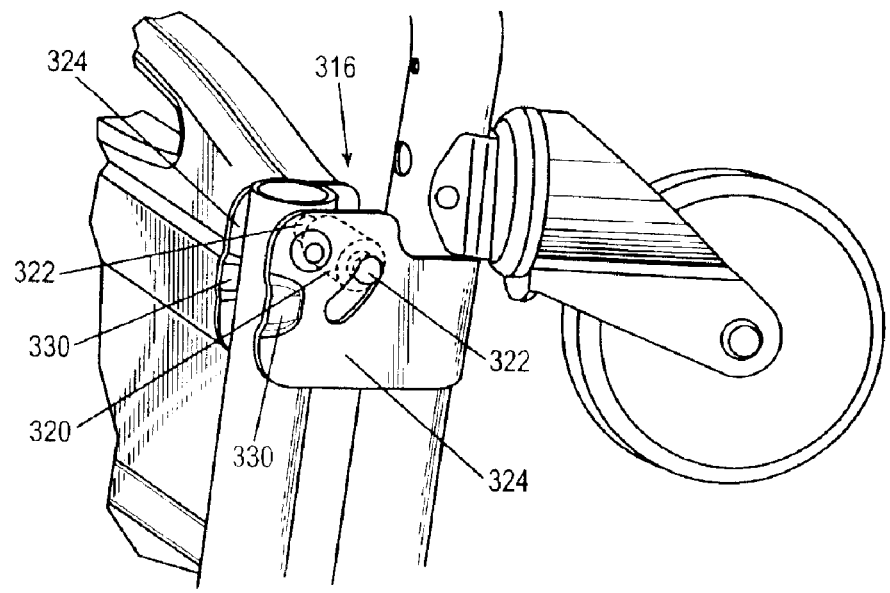

FIGS. 13–14 are perspective views of an alternative embodiment for the hinge between the step ladder frame and the hand truck frame.

Figure 15:
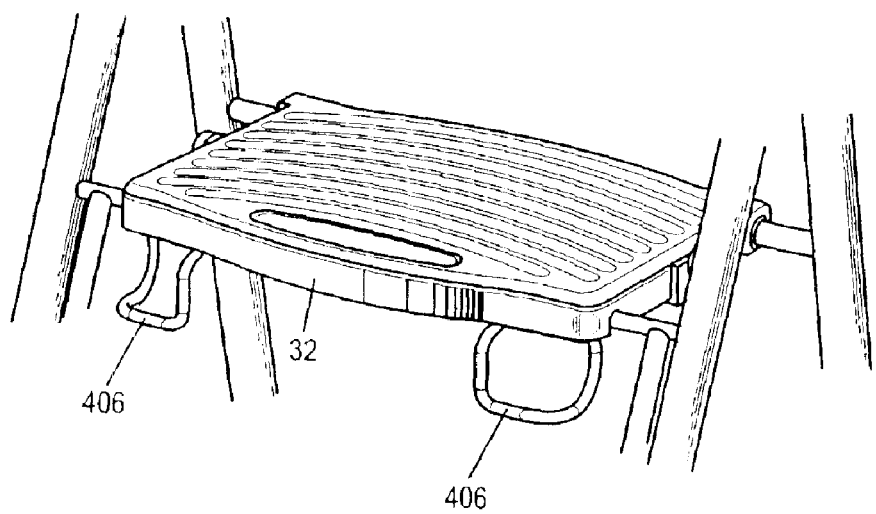

FIG. 15 is a perspective view of an alternative embodiment for the looped arms attached to the top step of the step assembly.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for a multi-use move, lift and support device that is illustrated herein as a combination hand truck, dolly and step ladder device. A device in accordance with the present invention provides the full functionality of a hand truck, dolly and step ladder integrated into a single design that is lightweight, easy to operate, and can be easily converted from one configuration to another. A description of each and every use of a device in accordance with the present invention would be too voluminous to include herein, so the present disclosure is directed to those embodiments and uses that are believed to be most clearly representative of the present invention. However, the present invention should not be limited merely to the embodiments and uses disclosed herein, but should be construed to include all of the concepts and teachings disclosed herein.

With reference to FIG. 1, a multi-use device 10 in accordance with the present invention is illustrated in a hand truck configuration. The multi-use device comprises a step ladder frame 12 and a hand truck frame 14 that is pivotally connected to the step ladder frame 12 by a hinge 16 so as to pivot about a pivot pin 18.

The step ladder frame 12 includes a first elongated leg 20 and a second elongated leg 22 interconnected at a first end by a U-shaped handle 24. Cross members 26 and 27 interconnect the elongated legs 20, 22 at a distal end opposite the U-shaped handle 24. A step assembly 28 is pivotally connected to the step ladder frame 12 between the elongated legs 20, 22. The step assembly 28 includes two lower steps 30, 31 and a top step 32, all of which are interconnected by connecting member 34 pivotally connected to the step ladder frame 12. The connecting member 34 is pivotally attached to each step on both sides. Thus, when the top step 32 rotates, subsequently steps 30 and 31 also rotate in a coordinated fashion, as discussed further below with reference to the step ladder embodiment. A first pair of wheels 40 is attached to the step ladder frame 12 at the first end near the U-shaped handle 24. A second pair of wheels 42 is attached to the step ladder frame 12 at a second end near the cross member 26. The wheels can be of any suitable design, but are preferably caster weldment.

In the embodiment illustrated in FIG. 1, each wheel of the first pair of wheels 40 and the second pair of wheels 42 are attached to the step ladder frame 12 by a sleeve that fits about the frame 12 in a manner so as to be rotatable about the frame 12. A spring-loaded button is provided in the frame 12 for engaging holes in the sleeve in order to hold the wheel into place. The position in which the wheels may be locked in place is determined by the position of the holes and the spring-loaded button, which can be placed where desired. Accordingly, as illustrated in FIG. 1, the first pair of wheels 40 is rotated inward when the device is in the hand truck configuration.

The hand truck frame 14 includes a cross member 50 near a first end of the hand truck frame 14 near hinge 16, and a handle cross member 52 at a second end of the hand truck frame opposite the first end. A pivotally mounted support plate 54 is attached at the second end of the hand truck frame 14 for supporting objects that may be lifted or carried when using the device 10 in the hand truck configuration.

With reference to FIGS. 2A–2B, the support plate 54 is illustrated in more detail in both a lowered position (FIG. 2A) and in an upright stored position. The support plate 54 includes locking means 56 for securing the step ladder frame 12 and the hand truck frame 14 together, such as in the hand truck configuration. The locking means 56 in the illustrated embodiment comprises a plate 58 having attached a lip 60 at one edge and a hook 62 at a side edge. Accordingly, as illustrated in FIG. 2A, when the support plate 54 is in a lowered position, the lip 60 engages the cross member 27 of the step ladder frame 12 so as to secure step ladder frame 12 to the hand truck frame 14 during use in the hand truck configuration. As illustrated in FIG. 2B, when the support plate 54 is in an upright stored position, the hook 62 engages the cross member 27 of the step ladder frame 12 to secure the hand truck frame 14 to the step ladder frame 12 when in use in the hand truck configuration.

With reference to FIG. 3, spring clips 64 are attached to the hand truck frame 14 for receiving and holding the support plate 54 in an upright rest position. Alternatively, magnetic latches can be utilized in place of the spring clips 64. Specifically, one or more brackets with magnets attached thereto can be secured to the hand truck frame 14 at substantially the same location as the spring clips 64. Thus, when the support plate 54 is moved into an upright position, the magnetic bracket(s) would engage and hold the support plate 54.

Accordingly, with reference back to FIG. 1, the device 10 can be configured as a hand truck by placing the step ladder frame 12 and the hand truck frame 14 in a close proximity to one another so that the elongated legs of each frame are oriented in a substantially parallel fashion. The step ladder frame 12 and hand truck frame 14 can be secured together by locking means 56. To assist in securing the step ladder frame 12 and the hand truck frame 14 to one another, a latch 70 is provided on at least one side of the device 10. The latch 70 can take any number of different forms for securing the two frames together, as may be desired. In the illustrated embodiment, the latch 70 is a gravity latch that self-closes when the step ladder frame 12 and hand truck frame 14 are brought together while in a hand truck configuration. When converted into a dolly configuration, the latch is designed to fall open on its own, allowing the hand truck frame 14 to be rotated into position as a handle.

The device 10 in the hand truck configuration can be used by placing the support plate 54 under an object to be lifted and/or moved and then rotating handle 24 away from the object so as to pivot the device about the second pair of wheels 42, thereby lifting the object. The object then can be moved by rolling the device 10 on the second pair of wheels 42 to a desired location where the lifting process can be reversed to lower the object to the ground.

With reference to FIGS. 4A–4E, a crate 80 can be used in conjunction with the device 10 in order to facilitate the lifting and carrying of objects. In accordance with the present invention, the crate 80 may be any crate of suitable design in structure to be attached to and carried using the device 10. For example, a collapsible crate such as the one described in U.S. Pat. No. 4,798,304 can be modified to include fasteners 82 for securing the crate 80 to the device 10. In one embodiment, illustrated in FIG. 4C, the fasteners 82 may be configured as clamps attached to or are integrally molded with the crate 80. The clamps include C-shaped-notches 83 that receive and frictionally hold the tube framing of the hand truck frame 14. An alternative design, a collapsible crate 80' is illustrated in FIGS. 4D–4F, wherein the fasteners are configured as outwardly-facing cuffs 84 with arcuate outer walls 85 that receive and frictionally hold the elongated legs of the hand truck frame 12. In addition, the arcuate outer walls 84 include slots 86 for receiving pins 88 that are attached to facing surfaces of the hand truck frame 12 as shown in FIGS. 4E and 4F. This configuration provides a more secured attachment of the crate 80 to the device 10, which may be desired in certain applications.

With reference to FIG. 5, the device 10 is illustrated in a step ladder configuration. Device 10 can easily be converted to the step ladder configuration by unlocking the side latches 70 and actuate support plate 54 so as to allow the hand truck frame 14 to be rotated about pivot pin 18 away from the step ladder frame 12. The hand truck frame 14 may be locked into position with relation to the step ladder frame 12 by a locking mechanism 102. The locking mechanism 102 in the illustrated embodiment comprises the rotatably-mounted top step 32 of the step assembly 28. The top step 32 includes a groove 104 (see, e.g. FIG. 1) that receives the cross member 50 (see, e.g. FIG. 1) of the hand truck frame 14 when rotated into a substantially horizontal position, as shown in FIGS. 5 and 6. The locking mechanism 102 further includes a pair of looped arms 106 extending from a distal end of the top seat 32. The looped arms 106 are configured to guide the cross member 50 into groove 104 and to prevent the step ladder frame 12 and hand truck frame 14 from rotating any farther apart. The groove 104 is configured to receive the cross member 50 so as to prevent the step ladder frame 12 and hand truck frame 14 from rotating together. As a safety feature, when the top step 32 is initially rotated toward a horizontal position to lock the step ladder frame 12 and hand truck frame 14 in position, the looped arms 106 initially engage the cross member 50 in a first position 108 (illustrated in FIG. 6) such that the top step 32 (and steps 30, 31) are at an obviously improper angle, and thus insecure. A predetermined amount of force must then be applied to the distal end of the top step 32 in order to pass the cross member 50 past the looped arms 106 and into the groove 104. As previously mentioned, once the cross member 50 is received within groove 104, looped arms 106 operate to prevent the hand truck frame 104 from rotating from the step ladder frame 12 further than desired when in the step ladder configuration.

The connecting member 34 is rotatably attached to the seats 30, 31 on one end and rotatably attached to the top step 32 on the other end to provide simultaneous rotation of steps 30, 31 and 32. The steps 30, 31 and 32 are each rotatably attached to the step ladder support frame 12 on both sides, as illustrated in FIG. 5. When the top step 30 is lowered into place about cross member 50, the lower steps 30, 31 are substantially horizontal and supported at one end by the cross member about which the steps are rotatably mounted at an opposite end by the connecting member 34.

In the embodiment illustrated in FIG. 5, the first pair of wheels 40 and second pair of wheels 42 are attached to the step ladder frame in a slightly different manner than that discussed above. Specifically, the wheel assemblies are attached to a U-shaped bracket 108 that is fitted about an elongated leg of the step ladder frame 12 and attached thereto by a bolt or rivet, as well known in the art. This design may be particularly advantageous in that it limits the number of moveable parts and allows for the removal of the wheels from the step ladder frame 12 by removing the securing bolt, as may be desired in certain applications.

With reference to FIG. 7, the device 10 is shown in a dolly configuration. The device 10 can be converted into the dolly configuration by placing the device 10 in an orientation to the ground such that both pairs of wheels 40, 42 are on contact therewith. By placing the device on the ground in this manner, the latch 70 automatically releases, allowing the hand truck frame 14 to be pivoted about pivot pin 18 into a substantially vertical orientation, at an approximately 90 degree angle with respect to the step ladder frame 12. In this configuration, the handle cross member 52 operates as a handle for the dolly, allowing the user to manipulate the movement and direction of movement of the device 10, as desired. A dolly support bar 120 is utilized to secure the hand truck frame 14 in an upright position. For example, the dolly support bar 120 can be pivotally attached to the hand truck frame 14 by cross member 50. As illustrated in FIG. 8A, the dolly support bar 120 includes a U-shaped clasp 122. When the dolly support bar 120 is rotated toward the first end of the step ladder frame 12, the U-shaped clasp 122 receives the handle 24 of the step ladder frame 12. By design, the U-shaped clasp is configured so the handle cross member 52 can receive forces in any horizontal direction without the dolly support bar 120 becoming dislodged from the handle 24.

When not in use, the dolly support bar 120 can be stored in an upright position by rotating the dolly support bar into position between the elongated legs of the hand truck frame 14 where it is received by two opposing stops 124, as illustrated in FIGS. 8A–8B. The stops 124 are preferably made from polyethylene plastic, or any other suitable slippery plastic, and are held in place on hand truck frame 14 by rivets or other suitable fastening means. The stops 124 include an arcuate recess between two protruding lips, one lip extending far enough around the dolly support bar to prevent it from being pushed past the stops 124, as shown in FIG. 8B.

With reference generally to FIGS. 9A–9C, illustrated is an embodiment of a detachable tray 130 for use with the device 10 in various configurations. The detachable tray 130 has a work surface 130 suitable for holding or supporting work items or work pieces. The first surface 132 can include recesses 134 configured to hold relatively smaller work pieces or work items, or for holding refreshments or the like. Slots 136 are provided at one end of the tray 130 for receiving and holding work pieces and/or work items, such as gardening tools or cleaning equipment. Notches 138 are provided in the side walls of the tray 130 for securing the tray to the device 10 in the various configurations.

For example, with reference to FIG. 9B, the tray 130 is shown in use with the device 10 in the step ladder configuration, in place over the top step 32. The notches 138 receive cross member 50 of the hand truck support frame 12 and the cross member that rotatably attaches the top step 32 to the step ladder frame 14. If desired, one or more of the notches 138 may include a lateral slot for further securing the tray 130 to the device 10, wherein one or more of the cross members are received into the slots so as to prevent rotational movement of the tray 130 when installed on device 10.

With reference to FIG. 9C, the tray 130 is shown in use with the device 10 in a dolly configuration, in place over the step assembly 28. The notches 138 are designed to receive cross members associated with each step 30, 31, 32 and attached to the step ladder frame 14, thereby securing the tray 130 in place. As mentioned previously, one or more of the notches 138 may include slots for further securing the tray 130 in place. While not required, it is preferred that the tray be fabricated using well known injection molding techniques, and utilizing polypropelene, polyethylene or another suitable material.

With general reference to FIGS. 10A–10C, a detachable tray 150 provides an alternative tray embodiment for use with the device 10. The detachable tray 150 includes a first section 152 and a second section 154 rotatably coupled thereto by pivot pin 156. The tray 150 includes a recess 158 for receiving and holding work items and/or work pieces. While the recess 158 is shown and centrally located in a rectangular configuration, the recess may take other shapes such as square, circle, oval, etc., and may be located at different points on the upper surface of tray 150 and/or on section 154 of tray 150. Notches 160 are provided in the side wall of tray 150 for securing tray 150 to the device 10. One of the notches 160 includes a slot 162 for engaging a cross member of the device 10 for further securing tray 150.

With reference to FIG. 10B, the tray 150 is shown in use with the device 10 in the step ladder configuration. In this configuration, the slot 162 receives the cross member associated with the top step 32 of the step assembly 28 while a second notch 160 receives the cross member 150 of the hand truck frame 12. The second section 154 of the tray 150 is rotated underneath the first section 152 so that the distal end of the second section 154 is received in the U-shaped clasp 122 of the dolly support bar 120. Because of the extended lip on the stops 124 that hold the dolly support bar 120 from passing through the hand truck support frame 12, the first section 152 of the tray 150 can support a relatively significant amount of weight without tipping or overturning the device 10.

In FIG. 10C, the tray 150 is shown in use with the device 10 in the dolly configuration. As with the previous embodiment of the tray, the notches 160 in the side wall of the tray 150 receive the cross members associated with the steps 30, 31 and 32 of the step assembly 28 and attached to the step ladder frame 12, thereby securing the tray 150 to the device 10.

With general reference to FIGS. 11A–11C, illustrated is a detachable seat 180 for use with the device 10 in a step ladder configuration. The seat 180 comprises a molded seat platform 182 and a support 184. Molded seat platform 182 comprises an arcuate seating service 186, and upper step brace 188 and a lower step brace 190. The upper step brace is configured to extend over and around a step 31 of the step assembly 28 while the lower step brace 190 is configured to rest on and against a lower step 30. Accordingly, the molded seat platform 182 can be mated to the step assembly 28 in a manner so as to support a user that might sit on seating surface 186. For additional support, a support structure 184 may be attached to the molded seat platform 182. In the embodiment shown, the support structure 184 comprises a metal or aluminum tube bent into a U-shape and fitted to the bottom of the molded seat platform 182, as shown in FIG. 11B. However, the support structure 184 can be attached to the seat in any conventional manner, or may be integrally formed with the molded seat platform 182. FIG. 11C shows the seat 180 being attached to the step assembly of the device 10 and the step ladder configuration. In this embodiment, the seat 180 is placed over the lower steps 30, 31 and then lowered into place such that the upper step brace 188 and lower step brace 190 engage the respective upper and lower steps 31, 30.

With reference to FIG. 12, an alternative embodiment for hinge 16 is illustrated. In this embodiment, a hinge 216 is pivotally secured to the step ladder fame 12 and the hand truck frame 14 in substantially the same manner as hinge 16. However, the hinge 216 includes a slotted track 218 for receiving a pin 220 pivotally attached to the hand truck frame 14 at a first end. The pin 220 is received within the slotted track 218 of hinge 216 at a second end so as to slide there within. The pin 220 can be held within the track 218 by various means known to those of ordinary skill in the art, such as by a nut or clamp secured to the pin.

Accordingly, when the device 10 is in the step ladder configuration, the pin 200 is located at a first position 222 that limits the angle of movement between the step ladder fame 12 and the hand truck frame 14. This safety feature prevents the step ladder from falling flat accidentally. In a dolly configuration, the pin 220 is located in a second position 224 that likewise limits the separation of the step ladder frame 12 and the hand truck frame 14. Lastly, when in the hand truck configuration, the pin 220 is located in a third position 226. The third position is also the intermediate position that the pin must travel through when transitioning between the step ladder configuration and the dolly configuration. Thus, the hinge 216 can operate alone or in combination with other features of the present invention to provide safe operation of the device 10, particularly in the step ladder configuration.

With reference to FIGS. 13 and 14, an alternative embodiment for hinge 16 is illustrated. In this embodiment, a hinge 316 is pivotally secured to the step ladder fame 12 and the hand truck frame 14 in substantially the same manner as hinge 16. However, the hinge 316 includes a spring-loaded retention latch 320. The latch 320 is attached to the hand truck frame 14 and included two opposing spring-loaded buttons 322. The hinge 316 is U-shaped with two parallel sides 324. Each side 324 includes a crescent-shaped slot 326 that receives a respective button 322. Accordingly, the hinge 316 provides a means for limiting the angle of movement between the step ladder fame 12 and the hand truck frame 14, thereby preventing the step ladder from falling flat accidentally. It is sufficient to utilize the hinge 316 on one side of the device 10, though it may be desirable in certain circumstances to include the hinge 316 on both sides of the device.

In order to configure the device 10 as a dolly, the opposing spring loaded buttons 322 can be depressed so that they are no longer extending into the slots 326. This allows the hand truck frame 12 to be positioned in an approximately 90 degree angle with respect to the step ladder frame 12. To assist in the return of the hand truck frame 14 into the step ladder or dolly configurations, ingress grooves 330 are provided on respective edges of the sides 324 of hinge 316. The grooves 330 are configured to receive the buttons 322 and gradually depress them in an automatic fashion as the hand truck frame 14 is moved toward the step ladder frame 12. The buttons 322 are released when they come into contact with the slots 326 as the hand truck frame is moved closer to the step ladder frame 12.

With reference to FIG. 15, illustrated are alternative embodiments for the looped arms 106. Specifically, looped arms 406 can be attached to the top step 32 of the step assembly in any suitable manner, such as by rivets. As with the looped arms 106, the respective designs of the looped arms 406 operate to secure the top step 32 to the cross member 50 in substantially the same manner as the looped arms 106.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multi-use move, lift and support device, comprising:
    a step ladder frame having a handle at a first end and a pair of elongated legs extending to a second end;
    a hand truck frame pivotally connected to the step ladder frame at a first end and elongated legs extending to a second end, wherein the hand truck frame has at least three positions relative to the step ladder frame for a step ladder configuration, a hand truck configuration, and a dolly configuration;
    a step assembly attached to the step ladder frame, and having a plurality of steps pivotally attached to the elongated legs, wherein the plurality of steps includes a top step;
    a support plate pivotally connected to a second end of the hand truck frame;
    a first pair of wheels attached to the first end of the step ladder frame and a second pair of wheels attached at the second end of the step ladder frame; and
    wherein in a step ladder configuration, the top step attaches to a cross member extending between the legs of the hand truck frame and secures the hand truck frame and step ladder frame in a fixed relationship to one another.

2. The device of claim 1, further comprising a collapsible crate that sits on the support plate and removably attaches to the respective legs of the hand truck frame.

3. The device of claim 2, wherein the collapsible crate includes means for frictionally attaching to the legs of the hand truck frame.

4. The device of claim 1, further comprising a removable seat that is configured to fit about at least two steps of the step assembly so as to be frictionally held in place when installed on the device.

5. The device of claim 1, further comprising a removable tray that is configured to secure over a step of the step assembly when the device is in the step ladder configuration, whereby the tray provides a substantially flat surface.

6. The device of claim 5, wherein the removable tray is configured to secure over the step assembly when the device is in a dolly configuration, whereby the tray provides a substantially flat surface.

7. The device of claim 5, wherein the removable tray includes means for holding at least one of work items and work pieces.

8. The device of claim 1, wherein the first pair of wheels are rotatably mounted to the step ladder frame.

9. The device of claim 1, wherein the top step including at least two connecting arms pivotally attached to the top step, and wherein the connecting arms are configured to secure the top step to the cross member at the first end of the hand truck frame.

10. The device of claim 1, wherein the support plate engages the second end of the step ladder frame when in an upright position and when in a deployed position so as to secure the hand truck frame and the step ladder frame together.

11. The device of claim 1, further comprising a frictional clip attached to a hand truck frame to hold the support plate in an upright position.

12. The device of claim 1, further comprising a dolly support bar pivotally attached to the hand truck support frame, the support bar to be configured to removably attach to the first end of the step ladder frame when the hand truck frame and the step ladder frame are positioned in the dolly configuration, thereby locking the second end of the hand truck frame into a handle position.

* * * * *